(12) United States Patent
Kolpasky et al.

(10) Patent No.: US 7,516,811 B2
(45) Date of Patent: Apr. 14, 2009

(54) VEHICLE ACCESSORY PEDAL AND METHOD

(75) Inventors: Kevin G. Kolpasky, Shelby Township, MI (US); James T. Embach, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 449 days.

(21) Appl. No.: 11/063,330

(22) Filed: Feb. 22, 2005

(65) Prior Publication Data

US 2006/0185925 A1  Aug. 24, 2006

(51) Int. Cl.
*B60K 26/00* (2006.01)
(52) U.S. Cl. ............................ 180/333; 180/315; 701/49
(58) Field of Classification Search .................. 180/333, 180/315; 74/512; 701/49
See application file for complete search history.

(56) References Cited

U.S. PATENT DOCUMENTS

| 5,422,521 | A | * | 6/1995 | Neer et al. ................... 307/119 |
| 5,808,374 | A | * | 9/1998 | Miller et al. ................ 307/10.1 |
| 5,810,107 | A | * | 9/1998 | Krel .......................... 180/275 |
| 2003/0037985 | A1 | * | 2/2003 | Jeppe et al. ................. 180/333 |
| 2005/0103555 | A1 | * | 5/2005 | Cannon et al. .............. 180/336 |

* cited by examiner

*Primary Examiner*—Ruth Ilan

(57) ABSTRACT

The present invention includes a foot-operated accessory pedal located on the floor area of a vehicle interior. The accessory pedal is depressible to activate one of a plurality of vehicle functions. Further included with the present invention is a hand-operated input device operative to assign which of the plurality of vehicle functions the accessory pedal will influence upon selective depressions. Moreover, a display unit is included operative to indicate which of the plurality of vehicle functions the accessory pedal is operative to influence.

11 Claims, 1 Drawing Sheet

VEHICLE ACCESSORY PEDAL AND METHOD

TECHNICAL FIELD

The present invention relates to an accessory pedal, mounted with respect to the floor area of a vehicle interior, operative to control one of a plurality of vehicular functions upon selective depression of the accessory pedal.

BACKGROUND OF THE INVENTION

A motor vehicle typically includes a multitude of components and systems that enhance the comfort and convenience of the driver and passengers. Such systems include, for example, audio systems having a radio, speakers, compact disc player, and cassette player; climate systems having heating, ventilation, and air conditioning components; navigational systems; etc.

Each of the systems typically includes an interface through which the driver of the vehicle can interact with the system. For example, control of a system requires that the driver of the vehicle input command information via the interface to which the system is responsive to vary a system characteristic. Each system may also supply information to the driver via the interface. For example, an audio system will indicate the radio station to which it is tuned, a climate control system will indicate the fan speed or the thermostat setting, and a navigational system will indicate location information.

SUMMARY OF THE INVENTION

A vehicle with a multifunction control system is provided for a plurality of vehicular systems or accessories, each of the systems having a plurality of variable characteristics. The control system includes an accessory pedal; a control unit operative to control a plurality of vehicular functions; and an input device. The accessory pedal is selectively depressible to send a first signal to the control unit. The first signal is operative to activate one of a plurality of vehicle functions. The input device is operable to send a second signal to the control unit; and the second signal assigns one of the plurality of vehicular functions to the first signal receivable from the accessory pedal.

In one aspect of the present invention, the input device includes a ring-shaped member or hand-operated programmer defining an annular space. The ring-shaped member is rotatable about an axis.

In another aspect of the present invention, the vehicle includes a display unit configured to receive a third signal from the control unit; the third signal indicates which of the plurality of vehicular functions the first signal of the accessory pedal is assigned.

More specifically, a vehicle with a vehicle body defining a vehicle interior having a floor area is provided. Also, an accessory pedal mounted with respect to the floor area of the vehicle interior and a control unit operable to control a plurality of vehicle functions is included. The accessory pedal is selectively depressible and upon depression of the accessory pedal a first signal is sent from the accessory pedal to the control unit. The first signal is operative to activate one of the plurality of vehicle functions. Further provided is an input device mounted with respect to the vehicle interior that is operative to send a second signal to the control unit. The second signal assigns one of the plurality of vehicle functions to the first signal received from the accessory pedal. The accessory pedal is accessible to an operator of the vehicle.

Additionally, a multi-function control system for a plurality of vehicle accessories is provided. The control system includes a foot-operated activator and a hand-operated programmer. A control unit is further provided, which is connectable to the plurality of accessories and preselectable by the hand-operated programmer for enabling the foot-operated activator to control the accessory preselected.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
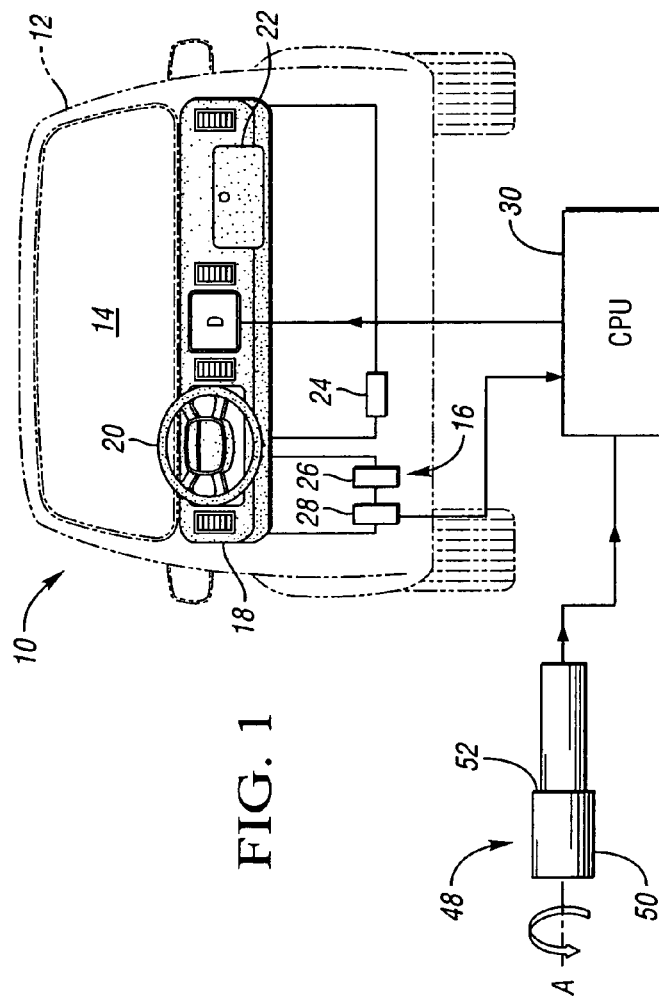
FIG. 1 is a schematic depiction of a vehicle with a control system, which includes an accessory pedal; an input device and a display unit.

Referring to FIG. 1, a vehicle 10 is schematically depicted. The vehicle includes a vehicle body 12, which defines a vehicle interior 14. The vehicle interior 14 includes a floor area 16 and an instrument panel 18. The instrument panel 18 includes several user or driver devices including a steering wheel 20, display unit D and a glove box 22. The floor area 16 of the vehicle interior includes a foot-operated gas pedal 24, foot-operated brake pedal 26, and a foot-operated accessory pedal 28 mounted thereto, all of which are accessible to a vehicle driver.

The accessory pedal 28 is pivotably secured to the vehicle floor area 16 so that it is depressible upon the application of pressure. Wired to the accessory pedal 28 is a control unit 30, which controls or preselects a plurality of vehicle functions or accessories (or first and second components characterized by first and second variable characteristic respectively). The control unit has a first mode and a second mode of operation—sending and receiving electrical signals to control the plurality of vehicle functions. Such functions or accessories (or characteristics) include a wind-shield wiper 32, radio 34, seat heater 36, climate control system (HVAC) 38, head lights 40, sun roof opening 42, power windows 44, any other alternative function 46, etcetera. The control unit 30 is configured to receive a first signal from the accessory pedal 28. When the accessory pedal 28 is depressed the first signal is sent to the control unit. The first electrical signal is operative to activate one of the plurality of vehicle accessories or functions. In the depicted embodiment, the accessory pedal 28 is vertically depressible. Alternatively, the accessory pedal 28 can also be laterally moveable to activate another function. A vertically depressible pedal and a laterally depressible switch may be adjacent one another on the floor area 16 of the vehicle interior 14 to enable a user to activate multiple programmed functions.

In the depicted embodiment, the control unit 30 is further wired to an input device 48 (or hand-operated programmer). The input device 48 is mountable with respect to the vehicle interior 14. The input device 48 can be included on the column of the steering wheel 20, on the instrument panel 22, a console (not shown), or any other location reasonably accessible to the vehicle driver. The input device sends a second signal to the control unit 30; the second signal instructs the control unit 30 to assign one of the vehicle functions to the first signal received from the accessory pedal 28. In one embodiment, the input device includes a ring-shaped member 50 defining an annular space 52. The ring-shaped member 50 is rotatable about an axis, A. Upon rotation of the ring-shaped member 50 the second signal is sent to the control unit 30 to alter which of the plurality of vehicle accessories or functions the first signal is assigned.

Figure 2:
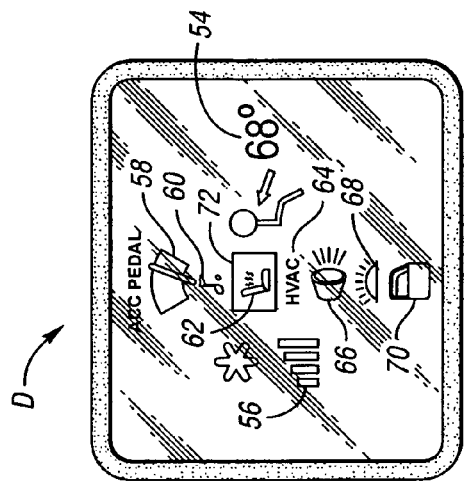
FIG. 2 illustrates a schematic depiction of the display unit.

In another embodiment the control unit 30 is further electrically wired to a display unit D, as highlighted in FIG. 2. The display unit D is secured to the instrument panel, as shown in FIG. 1. However, exemplary locations for the display unit D include the vehicle gage cluster, heads-up display, base of the windshield, A-pillar of the vehicle body, etcetera. The display unit D (of FIG. 2) is capable of displaying a number of icons indicating vehicle temperature at 54, volume level of the radio at 56, inter alia. Specific to the present invention, the display unit D contains a column of icons dedicated to visualizing the function to which the accessory pedal 28 is assigned. The column includes a windshield wiper icon 58, radio icon 60, seat heater icon 62, climate control icon 64, headlights icon 66, sun roof icon 68, and power windows icon 70. The control unit 30 sends a third signal to the display unit D indicating which of the plurality of vehicle functions is assigned to the accessory pedal 28. Each icon can be selectively surrounded by a border 72; the border 72 indicating which of the plurality of vehicle functions the accessory pedal 28 is assigned. For example, the seat heater icon 62, which is bordered in FIG. 2, is assigned to the accessory pedal 28.

While the best modes for carrying out the invention have been described in detail, those familiar with the art to which this invention relates will recognize various alternative designs and embodiments for practicing the invention within the scope of the appended claims.

The invention claimed is:

1. A vehicle, comprising:
   a vehicle body defining a vehicle interior having a floor area;
   a gas pedal;
   a brake pedal;
   an accessory pedal mounted with respect to said floor area of said vehicle interior;
   a control unit operable for controlling a plurality of vehicular accessories; wherein said accessory pedal is selectively depressible independently of said gas pedal and said brake pedal to thereby send a first signal from said accessory pedal to said control unit, wherein said first signal activates a preselected accessory of said plurality of vehicular accessories; and
   an input device mounted with respect to said vehicle interior and operable for sending a second signal to said control unit, wherein said second signal instructs said control unit to assign one of said plurality of vehicular accessories to said first signal received from said accessory pedal to thereby select said preselected accessory;
   wherein said accessory pedal is accessible to an operator of the vehicle.

2. The vehicle of claim 1, wherein said input device includes a ring-shaped member, said ring-shaped member being rotatable about an axis; and
   wherein said control unit is configured such that rotation of said ring-shaped member operates to send said second signal to said control unit.

3. The vehicle of claim 1, further comprising:
   a display unit configured to receive a third signal from said control unit, said third signal being operable for indicating said predetermined one of said plurality of vehicular accessories.

4. A multi-function control system use with a vehicle having a brake pedal and a gas pedal, the multi-function control system controlling a plurality of vehicle accessories, comprising:
   a foot-operated accessory pedal for activating a preselected accessory of the plurality of vehicle accessories;
   a hand-operated input device for selecting said pre-selected accessory from among the plurality of vehicle accessories, said hand-operated input device including a rotatable ring-shaped member; and
   a control unit connectable to each of the plurality of vehicle accessories and operable for enabling said foot-operated accessory pedal to activate said pre-selected accessory in response to a depression of said foot-operated accessory pedal;
   wherein the plurality of vehicle accessories includes at least one of: a windshield wiper, a radio, a seat heater, a heating, ventilation, and air conditioning (HVAC) system, head lights, a sunroof, power windows, and an alternator of the vehicle.

5. The control system of claim 4, wherein said foot-operated accessory pedal is selectively depressible to thereby send a first signal from said foot-operated pedal to said control unit, wherein said first signal activate activates said pre-selected accessory.

6. The control system of claim 5, wherein said hand-operated input device is operable for sending a second signal to said control unit, wherein said second signal instructs said control unit to assign as said pre-selected accessory one of said plurality of accessories to said first signal received from said foot-operated accessory pedal.

7. The control system of claim 6, wherein said ring-shaped member is rotatable about an axis; and
   wherein said control unit is configured such that rotation of said ring-shaped member operates to send said second signal to said control unit.

8. The vehicle of claim 6, further comprising:
   a display unit configured to receive a third signal from said control unit, said third signal operable to indicate said pre-selected accessory as the assigned said one of said plurality of accessories.

9. A vehicle having a brake pedal for braking of the vehicle and a gas pedal for accelerating the vehicle, the vehicle comprising:
   a first vehicular accessory characterized by a first variable characteristic;
   a second vehicular accessory characterized by a second variable characteristic, said first and said second vehicular accessory being selected from the group consisting of: a windshield wiper, a radio, a seat heater, a heating, ventilation, and air conditioning (HVAC) system, head lights, a sunroof, power windows, and an alternator of the vehicle;
   a control unit operable to control the first and second variable characteristics;
   an accessory pedal that is selectively depressible independently of each of the brake pedal and the accelerator pedal, said accessory pedal being configured to transmit a first signal to the control unit when said accessory pedal is depressed; and
   an input device operatively connected to the control unit and operable for instructing the control unit to assign one of the first and second variable characteristics to the first signal received from the accessory pedal;

wherein the control unit is configured to cause the first variable characteristic to change in response to the first signal being assigned to the first variable characteristic; and wherein the control unit is configured to cause the second variable characteristic to change in response to the first signal being assigned to the second variable characteristic.

10. The vehicle of claim 9, wherein said input device includes a ring-shaped member, said ring-shaped member being rotatable about an axis; and wherein said control unit is configured such that rotation of the ring-shaped member operates to send a second signal to said control unit.

11. The vehicle of claim 9, further comprising:

a display unit configured to receive a third signal from said control unit, said third signal being operative to indicate the assigned said one of said first variable characteristic and second variable characteristic.

* * * * *